(12) United States Patent
Chung et al.

(10) Patent No.: US 12,510,135 B2
(45) Date of Patent: Dec. 30, 2025

(54) INNER GEAR WHEEL WITH IMPACT ABSORPTION STRUCTURE AND REDUCER USING SAME

(71) Applicant: Delta Electronics, Inc., Taoyuan (TW)

(72) Inventors: Chi-Wen Chung, Taoyuan (TW);
Hsien-Lung Tsai, Taoyuan (TW);
Chin-Hsiang Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 18/900,200

(22) Filed: Sep. 27, 2024

(65) Prior Publication Data
US 2025/0341245 A1     Nov. 6, 2025

Related U.S. Application Data

(60) Provisional application No. 63/642,301, filed on May 3, 2024.

(30) Foreign Application Priority Data

Aug. 28, 2024   (CN) .......................... 202411189583.7

(51) Int. Cl.
*F16H 55/14*     (2006.01)
*F16H 1/32*      (2006.01)
(Continued)

(52) U.S. Cl.
CPC .............. *F16H 1/32* (2013.01); *F16H 57/12* (2013.01); *F16H 55/14* (2013.01); *F16H 2055/176* (2013.01); *F16H 57/0006* (2013.01)

(58) Field of Classification Search
CPC .. F16H 1/2818; F16H 55/14; F16H 2055/176; F16H 57/0006; F16H 2001/325
See application file for complete search history.

(56) References Cited

U.S. PATENT DOCUMENTS 1,864,256 A  *  6/1932  Nardone  ............... F02N 19/001
                                               192/105 CD
2,500,393 A  *  3/1950  Williams  ................. F16D 3/00
                                                     74/411

(Continued)

FOREIGN PATENT DOCUMENTS

CN         103438183 A     12/2013
CN         105299203 A      2/2016
(Continued)

*Primary Examiner* — Sherry L Estremsky
(74) *Attorney, Agent, or Firm* — KIRTON McCONKIE; Evan R. Witt

(57) ABSTRACT

An inner gear wheel with impact absorption structure and a reducer using same are disclosed. The inner gear wheel includes a body wheel, fixing holes, an impact absorption structure and buffer elements. The body wheel includes an inner ring surface surrounding an axis and inner gears disposed around the inner ring surface. Fixing holes penetrate the body wheel along an axial direction. The impact absorption structure is disposed corresponding to one of the fixing holes, and includes buffer grooves and a connecting slit. The buffer grooves are disposed at two sides of the corresponding fixing hole along a circumferential direction. The connecting slit extends along the circumferential direction between the inner ring surface and the fixing hole and connects the pair of buffer grooves. The buffer elements are disposed in the buffer grooves to absorb stress transmitted from an outer gear plate engaged with the inner gear wheel.

17 Claims, 6 Drawing Sheets

(51) Int. Cl.
*F16H 57/12* (2006.01)
*F16H 55/17* (2006.01)
*F16H 57/00* (2012.01)

(56) References Cited

U.S. PATENT DOCUMENTS

| | | | |
|---|---|---|---|
| 3,425,301 A * | 2/1969 | Shannon | F16H 57/04 475/159 |
| 5,323,663 A * | 6/1994 | Ohgi | F16H 1/2818 310/83 |
| 9,829,071 B2 * | 11/2017 | Nakamura | F16H 55/16 |
| 10,673,304 B2 * | 6/2020 | Tsai | H02K 7/116 |
| 12,072,002 B2 * | 8/2024 | Francois | F16H 57/08 |

FOREIGN PATENT DOCUMENTS

| | | | | |
|---|---|---|---|---|
| CN | 107191543 A | | 9/2017 | |
| CN | 112762147 A * | | 5/2021 | B25J 9/102 |
| DE | 102010047144 A1 * | | 4/2012 | F16H 1/2818 |
| DE | 102017124717 A1 * | | 4/2019 | F16H 57/08 |
| EP | 3467344 A1 * | | 4/2019 | F16H 1/32 |
| EP | 4257848 A1 * | | 10/2023 | F16H 49/001 |
| FR | 1231219 A * | | 9/1960 | F02N 15/046 |
| FR | 2914719 A1 * | | 10/2008 | F16H 1/2818 |
| GB | 734223 A * | | 7/1955 | F16H 1/2818 |
| GB | 901959 A * | | 7/1962 | F16H 1/2809 |
| JP | 2011183506 A * | | 9/2011 | |
| KR | 20230060702 A * | | 5/2023 | F16H 1/32 |
| WO | WO-2009102853 A1 * | | 8/2009 | F16H 57/082 |
| WO | WO-2012159788 A1 * | | 11/2012 | F16H 1/48 |

* cited by examiner

US 12,510,135 B2

INNER GEAR WHEEL WITH IMPACT ABSORPTION STRUCTURE AND REDUCER USING SAME

CROSS-REFERENCE TO RELATED APPLICATION

This application claims the benefit of U.S. Provisional Application No. 63/642,301 filed on May 3, 2024, and entitled "REDUCER IMPACT FORCE ABSORPTION STRUCTURE". This application claims priority to China Patent Application No. 202411189583.7 filed on Aug. 28, 2024. The entireties of the above-mentioned patent application are incorporated herein by reference for all purposes.

FIELD OF THE INVENTION

The present disclosure relates to an inner gear wheel and a reducer, and more particularly to an inner gear wheel with an impact absorption structure and a reducer using the same, wherein the impact absorption structure is constructed without increasing the volume of the device to meet the design considerations of processing convenience, cost reduction and volume reduction, and to achieve the purpose of improving the impact absorption effect.

BACKGROUND OF THE INVENTION

The reducer is an indispensable key technology for the robot movement, and the types of reducers used by the robot need low backlash to achieve high-precision applications. The conventional types of reducers with low backlash include planetary reducers, cycloidal reducers, and harmonic reducers. In particular, the harmonic reducer not only has small backlash, but also has a high reduction ratio, is lightweight, and is compact. Therefore, it is widely used in the field of industrial robots.

However, due to the miniaturization and lightweight of the reducer, when the reducer is impacted by an external force, the external force will be directly transmitted into the reducer and the gears will be easily damaged.

In order to reduce the impact of the external force, the reducer can be equipped with a torque sensor or a torque limiter for prevention. In the torque sensor method, the force is sensed through the torque sensor, and then the control techniques are utilized to prevent the impact force from damaging the reducer. However, the installation cost of the torque sensor is expensive and it is not conducive to cost reduction. As for the torque limiter, an additional mechanism is installed at the output end to absorb the impact force. The friction is mostly used as the force limit in the structure, so that a large structural volume is required for the mechanism setting. It is not conducive to the miniaturization and lightweight design of the overall structure.

Therefore, there is a need of providing an inner gear wheel with an impact absorption structure and a reducer using the same. The impact absorption structure is constructed without increasing the volume of the device to meet the design considerations of processing convenience, cost reduction and volume reduction, achieve the purpose of improving the impact absorption effect, and overcome the above drawbacks.

SUMMARY OF THE INVENTION

An object of the present disclosure is to provide an inner gear wheel with an impact absorption structure and a reducer using the same. The impact absorption structure is constructed without increasing the volume of the device to meet the design considerations of processing convenience, cost reduction and volume reduction, and to achieve the purpose of improving the impact absorption effect.

Another object of the present disclosure is to provide an inner gear wheel with an impact absorption structure and a reducer using the same. In the reducer for example a tooth difference planetary reducer architecture, the inner gear wheel made of metal or non-ferrous metal is designed to form an easy-to-deform impact absorption structure, and combined with buffer elements made of elastic high-damping materials. In that, when the inner gears of the inner gear wheel are stressed, the transmission path for transferring the stress to the screw fixing holes is elongated, and the impact absorption effect is improved. The inner gear wheel is designed as an easy-to-deform impact absorption structure combined with buffer elements without increasing the size of the entire structure. Therefore, it has great advantages in terms of convenient processing, cost reduction and volume reduction. In case of that the reducer is a planetary reducer with a tooth difference structure, the torque generated by a mechanical device such as a motor is inputted through the input shaft of the reducer connected thereto, so that the outer gear plate is rotated to perform the revolution and rotation motions. Then the output pin and the output plate are driven by the outer gear plate to rotate and output the torque. When the plurality of outer gears of the outer gear plate are engaged with the inner gears of the inner gear wheel, the impact force endured by the inner gears is further transmitted to the fixing hole of the inner gear wheel. In the present disclosure, an impact absorption structure is installed on the shortest path from the inner gears to the fixing hole, so that the impact force endured by the inner gear is transferred to the fixing hole along a longer path, and a better impact protection effect is achieved. Furthermore, the impact absorption structure in the present disclosure is hollowed out in the original structure of the inner gear wheel and then filled with elastic high-damping buffer materials. When the inner gear wheel is stressed, the elastic high-damping buffer materials are extruded and deformed by the stress, so that the impact force is further absorbed and the effect of protecting the ring gears is achieved. On the other hand, the impact absorption structure of the present disclosure is spatially corresponding to the fixing hole. The long hollow opening served as the buffer groove of the impact absorption structure and the connecting slit in communication therewith are designed according to the radius of the fixing hole to achieve a better designed impact absorption effect. It takes into account the effects of simple processing, less material use, and high strength.

In accordance with an aspect of the present disclosure, an inner gear wheel is provided and includes a body wheel, fixing holes, an impact absorption structure and buffer elements. The body wheel includes an inner ring surface and a plurality of inner gears, wherein the inner ring surface arounds an axis, the plurality of inner gears are disposed around the inner ring surface, and each of the plurality of inner gears is partially connected to an outer gear plate and engaged with the outer gear plate in a radial direction. The plurality of fixing holes are disposed on the body wheel and penetrate the body wheel along an axial direction. The plurality of impact absorption structures are spatially corresponding to the plurality of fixing holes and penetrate the body wheel along the axial direction, wherein each of the plurality of impact absorption structures comprises a pair of buffer grooves, a connecting slit and a pair of buffer elements, the pair of buffer grooves are disposed at two sides of a corresponding one of the plurality of fixing holes along a circumferential direction, the connecting slit is arranged between the inner ring surface and the corresponding one of the plurality of fixing holes, extended along the circumferential direction and in communication between the pair of buffer grooves, and the pair of buffer elements are made of elastic high-damping materials and disposed in the pair of buffer grooves respectively to absorb a stress transmitted from the outer gear plate engaged with the inner gear wheel.

In an embodiment, each of the buffer grooves includes a long hollow opening, the long hollow opening has a radial length and a circumferential width, and the radial length is greater than the circumferential width.

In an embodiment, a spaced width is formed between each adjacent two of the impact absorption structures, and a ratio of the spaced width to the radial length is ranged from 1:3 to 1:6.

In an embodiment, the long hollow opening includes an arc portion located at a long end thereof and having a curvature radius, the fixing hole has an opening radius, and the curvature radius is smaller than the opening radius.

In an embodiment, the connecting slit has a slit gap, and a ratio of the slit gap to the opening radius is ranged from 1:4 to 1:7.

In an embodiment, each of the plurality of fixing holes is a screw hole, which is fixed by a corresponding screw to form a fixed point for fixing the inner gear wheel.

In an embodiment, the body wheel is made of metals or non-ferrous metals.

In an embodiment, the outer gear plate includes an outer ring surface and a plurality of outer gears, wherein a tooth number of the plurality of outer gears and a tooth number of the plurality of inner gears of the body wheel are different.

In an embodiment, the outer gear plate is driven through rotation of the input shaft to perform revolution and rotation motions, and an output pin and an output plate are driven by the outer gear plate to perform a rotational motion and output a torque.

In an embodiment, the output plate includes a first output plate and a second output plate, and the first output plate and the second output plate are located at two opposite ends of the inner gear wheel, respectively.

In an embodiment, the inner gear wheel is connected to the output plate through a roller bearing.

In accordance with an aspect of the present disclosure, a reducer is provided and includes an input shaft, an outer gear plate, an inner gear wheel, and an output plate. The input shaft is arranged along an axial direction and configured to receive a power input. The outer gear plate includes an outer ring surface, a central shaft hole and a plurality of outer gears, wherein the central shaft hole penetrates the outer gear plate along the axial direction and is passed through by the input shaft, and the plurality of outer gears are disposed on the outer ring surface along a circumferential direction. The inner gear wheel is sleeved on the outer gear plate, and includes a body wheel, a plurality of fixing holes and a plurality of impact absorption structures. The body wheel includes an inner ring surface and a plurality of inner gears, wherein the inner ring surface is disposed around the input shaft, the plurality of inner gears are disposed around the inner ring surface, and each of the plurality of inner gears is partially connected to the outer gear plate and engaged with the outer gear plate in a radial direction. The plurality of fixing holes are disposed on the body wheel and penetrate the body wheel along the axial direction. The plurality of impact absorption structures are spatially corresponding to the plurality of fixing holes and penetrate the body wheel along the axial direction, wherein each of the plurality of impact absorption structures includes a pair of buffer grooves, a connecting slit and a pair of buffer elements, the pair of buffer grooves are disposed at two sides of a corresponding one of the plurality of fixing holes along the circumferential direction, the connecting slit is arranged between the inner ring surface and the corresponding one of the plurality of fixing holes, extended along the circumferential direction and connected between the pair of buffer grooves, and the pair of buffer elements are made of elastic high-damping materials and disposed in the pair of buffer grooves respectively to absorb a stress transmitted from the outer gear plate to the inner gear wheel. The output plate is arranged along the axial direction, disposed on an outer side of the inner gear wheel along the radial direction, and connected to the outer gear plate through an output pin, wherein when the power input is inputted through the input shaft, the input shaft drives the plurality of outer gears of the outer gear plate to engaged with the plurality of inner gears of the inner gear wheel, and the outer gear plate is rotated with the output pin, so that the output pin drives the output plate to perform a rotational motion and output a torque.

In an embodiment, each of the buffer grooves includes a long hollow opening, the long hollow opening has a radial length and a circumferential width, and the radial length is greater than the circumferential width.

In an embodiment, a spaced width is formed between each adjacent two of the impact absorption structures, and a ratio of the spaced width to the radial length is ranged from 1:3 to 1:6.

In an embodiment, the long hollow opening includes an arc portion located at a long end thereof and having a curvature radius, the fixing hole has an opening radius, and the curvature radius is smaller than the opening radius.

In an embodiment, the connecting slit has a slit gap, and a ratio of the slit gap to the opening radius is ranged from 1:4 to 1:7.

In an embodiment, each of the plurality of fixing holes is a screw hole, which is fixed by a corresponding screw to form a fixed point for fixing the inner gear wheel.

In an embodiment, the body wheel is made of metals or non-ferrous metals.

In an embodiment, the output plate includes a first output plate and a second output plate, and the first output plate and the second output plate are located at two opposite ends of the inner gear wheel, respectively.

In an embodiment, the inner gear wheel is connected to the output plate through a roller bearing.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
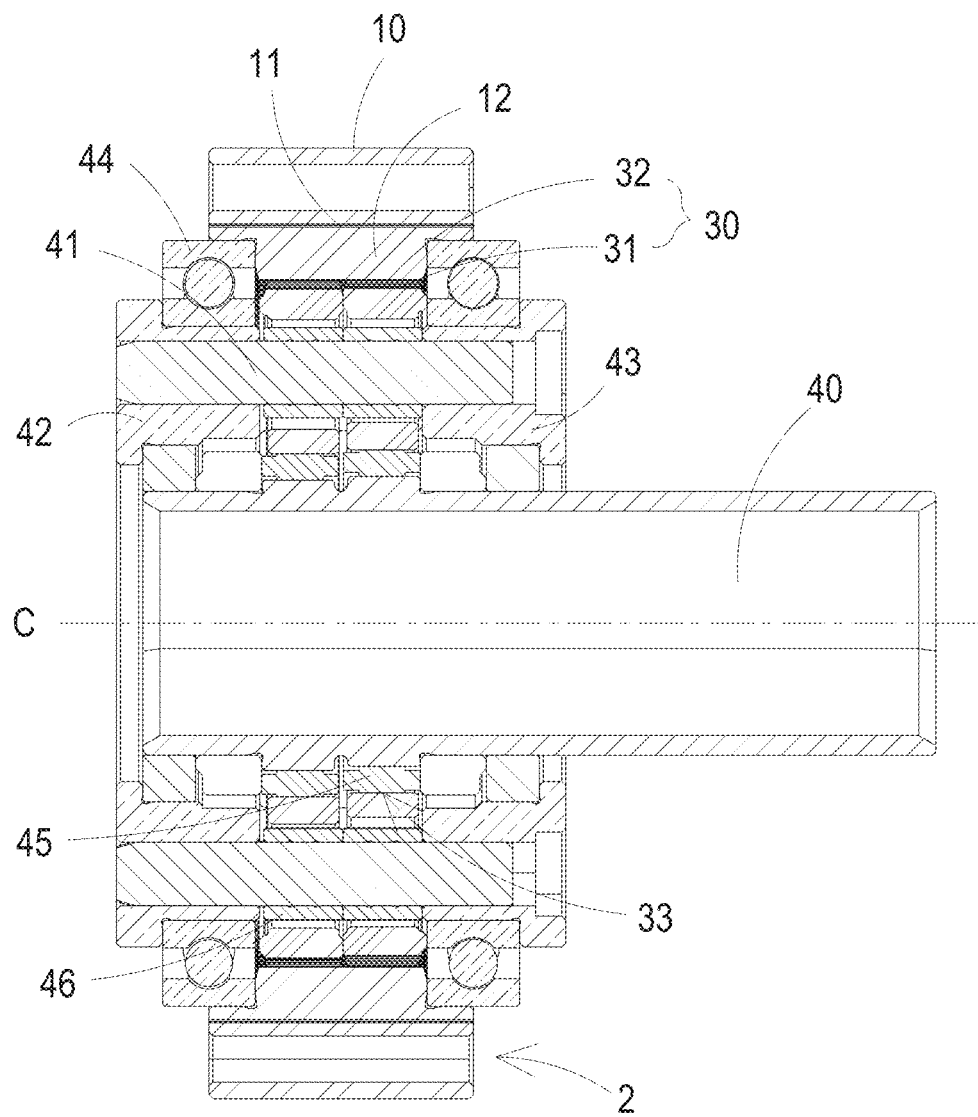
FIG. 1 is a cross-sectional view illustrating a reducer according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inner," "outer," "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
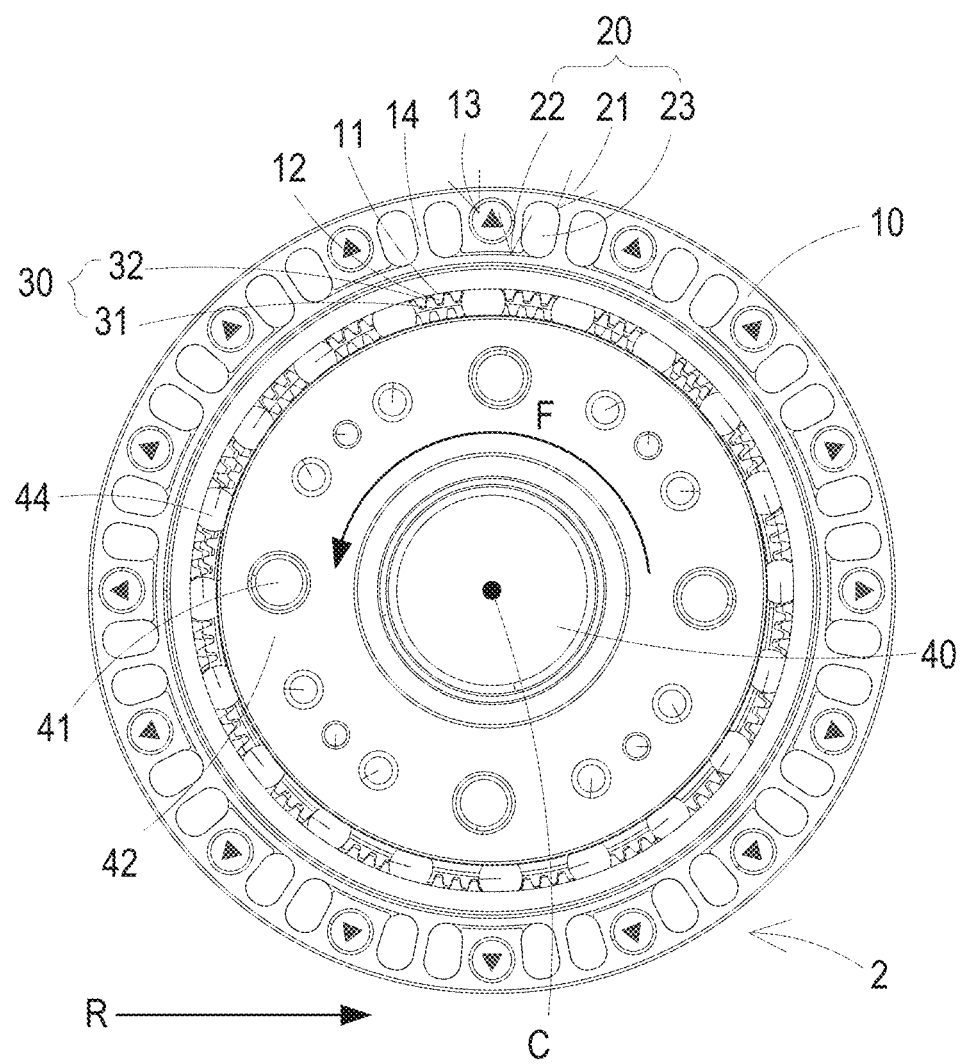
FIG. 2 is a front view illustrating the reducer according to the embodiment of the present disclosure.
Figure 3:
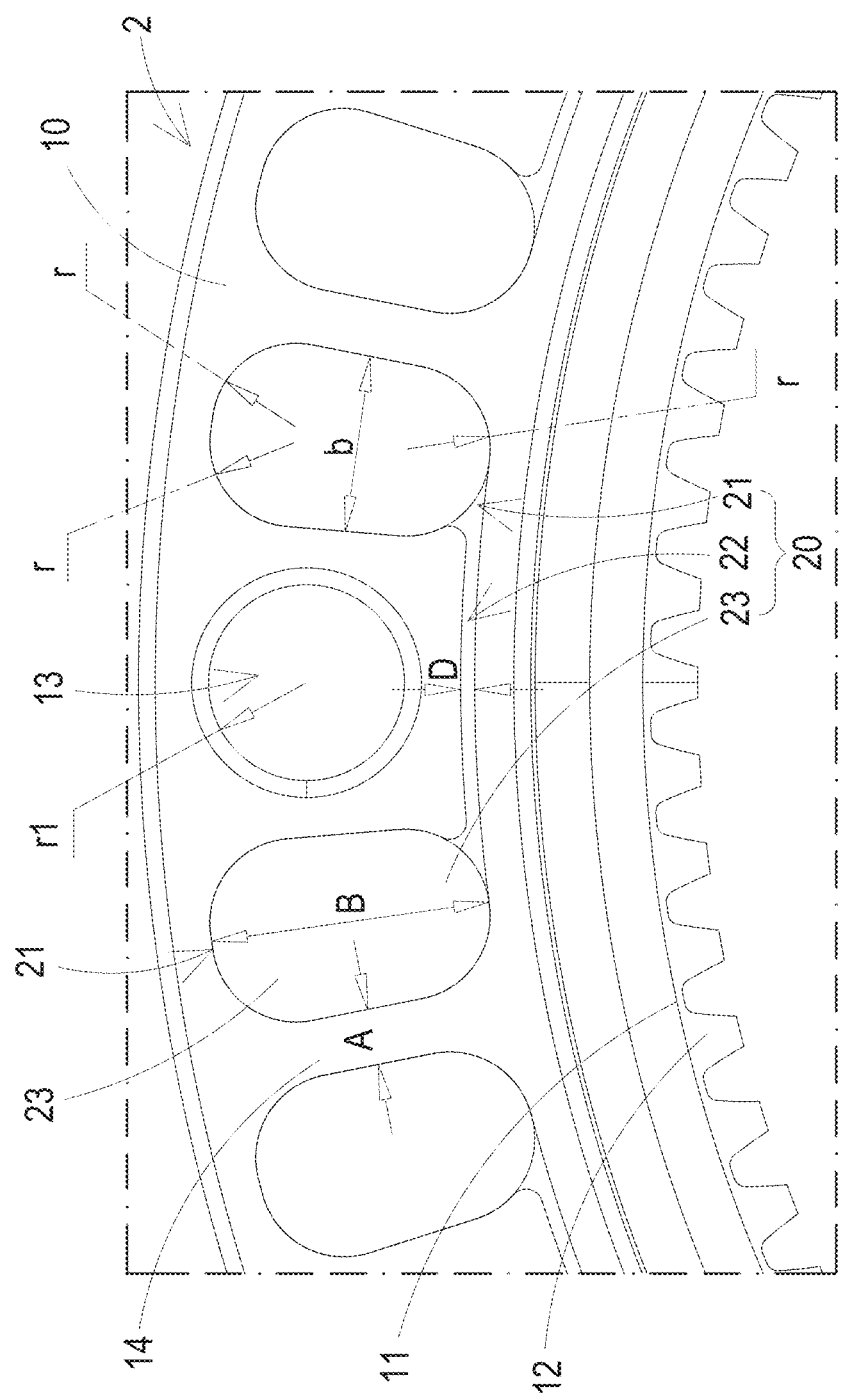
FIG. 3 is a schematic diagram showing the dimensional relationship of each components in the inner gear wheel according to the embodiment of the present disclosure.

Please refer to FIG. 1 to FIG. 3. The present disclosure provides an inner gear wheel 2 with an impact absorption structure. Preferably but not exclusively, the inner gear wheel is suitable for a reducer 1 with a tooth difference planetary reducer architecture. In the embodiment, the reducer 1 adopts front-end and rear-end output design, and includes an input shaft 40, an outer gear plate 30, an inner gear wheel 2 and at least one output plate 42, 43. The input shaft 40 is arranged along an axial direction C (i.e., the central axis direction across the drawing as shown in FIG. 2) and configured to receive a power (force) input provided by, for example, a motor. The outer gear plate 30 includes an outer ring surface 31, a central shaft hole 33 and a plurality of outer gears 32. The central shaft hole 33 is located at the substantial center position of the outer gear plate 30 and corresponding to the input shaft 40 in position. The central shaft hole 33 penetrates the outer gear plate 30 along the axial direction C and is passed through by the input shaft 40, so that the outer gear plate 30 is sleeved on the input shaft 40. When the input shaft 40 is rotated, the outer gear plate 30 is driven by the input shaft 40 to rotate. In the embodiment, the plurality of outer gears 32 are disposed on the outer ring surface 31 of the outer gear plate 30 along a circumferential direction F. The inner gear wheel 2 is sleeved on the outer gear plate 30, and the inner gear wheel 2 includes a body wheel 10, a plurality of fixing holes 13 and a plurality of impact absorption structures 20. The body wheel 10 includes an inner ring surface 11 and a plurality of inner gears 12. In the embodiment, the inner ring surface 11 is disposed around the central axis of the input shaft 40. The plurality of inner gears 12 are disposed around the inner ring surface 11 along the circumferential direction F. The tooth number of the plurality of outer gears 32 and the tooth number of the plurality of inner gears 12 on the body wheel 10 are different, so as to form the reducer 1 with the tooth difference planetary reducer architecture. In this way, each of the plurality of inner gears 12 is partially connected and engaged with the plurality of outer gears 32 of the outer gear plate 30 in a radial direction R. In the embodiment, the plurality of fixing holes 13 are disposed on the body wheel 10 along the circumferential direction F and penetrate the front and rear opposite ends of the body wheel 10 along the axial direction C. The plurality of impact absorption structures 20 are spatially corresponding to the plurality of fixing holes 13 and penetrate the body wheel 10 along the axial direction C. In the embodiment, each of the plurality of impact absorption structures 20 includes a pair of buffer grooves 21, a connecting slit 22 and a pair of buffer elements 23. Preferably but not exclusively, the pair of buffer grooves are a pair of long hollow openings. In detail, the pair of buffer grooves 21 are disposed at two sides of a corresponding one of the plurality of fixing holes 13 along the circumferential direction F, the connecting slit 22 is arranged between the inner ring surface 11 and the corresponding one of the plurality of fixing holes 13. Furthermore, the connecting slit 22 is extended along the circumferential direction F and in communication between the pair of buffer grooves 21, and the pair of buffer elements 23 are made of elastic high-damping materials and disposed in the pair of buffer grooves 21 respectively to absorb a stress transmitted from the outer gear plate 30 to the inner gear wheel 2.

In the embodiment, each of the plurality of fixing holes 13 penetrates the body wheel 10 along the axial direction C. Each fixing hole 13 on the body wheel 10 is surrounded by the corresponding impact absorption structures 20 at the left and right sides in the circumferential direction F and the lower side adjacent to the inner ring surface 11 and the inner gears 12. Preferably but not exclusively, each of the plurality of fixing holes 13 is a screw hole, which is fixed by a corresponding screw (not shown) for fixing the inner gear wheel 2 on an object or a structure (not shown). Namely, each fixing hole is fixed to form a fixed point, that is, the triangle mark as shown in FIG. 2. Thereby, the assembling strength of the inner gear wheel 2 is increased.

Notably, the inner gear wheel 2 is designed to form the impact absorption structure 20 which is easy-to-deform and additionally processed from an original structure of the body wheel 10 in the conventional product. Therefore, the impact absorption structures 20 can be processed without increasing the size of the original inner-gear body wheel 10*a*. In the embodiment, the impact absorption structures 20 are spatially disposed corresponding to the plurality of fixing holes 13. In order to achieve a better impact absorption effect and take into account the requirements of easy processing, less material use, and maintaining the overall structural strength, the pair of buffer grooves 21 with the long hollow openings and the connecting slit 22 connected thereto in each impact absorption structure 20 are designed according to the radius of the fixing hole 13. Please refer to FIG. 3. In the embodiment, the long hollow opening of the buffer groove 21 has a radial length B and a circumferential width b, and the radial length B is greater than the circumferential width b. In the embodiment, each adjacent two of the impact absorption structures 20 form a spaced arm 14, which is located between each adjacent two of the impact absorption structures 20 and has a spaced width A formed between each adjacent two of the impact absorption structures 20. Notably, in the embodiment, a ratio of the spaced width A to the radial length B is ranged from 1:3 to 1:6. In an embodiment, the long hollow opening of the buffer groove 21 includes an arc portion located at a long end thereof and having a curvature radius r. The fixing hole 13 has an opening radius r1. Preferably but not exclusively, the curvature radius r is smaller than the opening radius r1. In the embodiment, the connecting slit 22 has a slit gap D, and a ratio of the slit gap D to the opening radius r1 is ranged from 1:4 to 1:7. In addition, the body wheel 10 is made of metals or non-ferrous metals. It is easy to process to form the impact absorption structure 20 that is easy-to-deform and maintain the overall structural strength. The buffer elements 23 made of elastic high-damping materials are easy to process and provide sufficient impact absorption and structural support. Through the aforementioned dimensional design and material selection, the inner gear wheel 2 with the impact absorption structure 20 of the present disclosure has great advantages in terms of convenient processing, cost reduction, volume reduction and structural strength.

As shown in FIG. 1 and FIG. 2, in the embodiment, two output plates 42, 43 are arranged along the axial direction C and disposed on outer sides of the inner gear wheel 2 in the radial direction R. The two output plates 42, 43 are connected to the outer gear plate 30 in the radial direction R through the output pin 41. When the power input is inputted through the input shaft 40, the input shaft 40 drives the plurality of outer gears 32 of the outer gear plate 30 to engaged with the plurality of inner gears 12 of the inner gear wheel 2 in the radial direction R, and the outer gear plate 30 is rotated with the output pin 41 to perform the revolution and rotation motions, so that the output pin 41 drives the output plates 42, 43 to perform a rotational motion and provide an power output, for example output a torque. When the plurality of outer gears 32 of the outer gear plate 30 are engaged with the plurality of inner gears 12 of the inner gear wheel 2 in the radial direction R, the impact force endured by the inner gears 12 is further transmitted to the fixing holes 13 of the inner gear wheel 2. In the present disclosure, the impact absorption structure 20 is installed on the shortest path from the inner gears 12 to the corresponding fixing holes 13, so that the impact force endured by the inner gears 12 is transferred to the fixing holes 13 along a longer path, the impact is softened and a better impact protection effect is achieved. The force transmission path will be further explained below.

As shown in FIG. 1 and FIG. 2, in the embodiment, the outer gear plate 30 can be for example but not limited to a cycloidal gear plate, which is connected to the input shaft 40 through a needle bearing 45 and connected to the output pin 41 through a needle bearing, respectively. Preferably but not exclusively, the output pin 41 is a crankshaft including four eccentric sections with the same diameter, and there are four output pins 41. Each output pin 41 includes two concentric ends disposed along the axial direction C at two opposite ends thereof and two eccentric ends arranged between the two concentric ends. The two eccentric ends are spatially corresponding to the outer gear plate 30. When the outer gear plate 30 is driven by the input shaft 40 to rotate, the outer gear plate 30 drives the output pin 41 to rotate by connecting with the eccentric ends of the output pin 41. In that, the concentric ends of the output pin 41 are rotated synchronously, and a first output plate 42 and a second output plate 43 are driven by the concentric ends of the output pin 41 to rotate respectively. The first output plate 42 and the second output plate 43 are located at two opposite outer ends of the reducer 1 in the axial direction C. Preferably but not exclusively, the first output plate 42 is disposed adjacent to the motor and can be regarded as the front end of the reducer 1, and the second output plate 43 is disposed at another opposite end and regarded as the rear end of the reducer 1. Certainly, the front end and the rear end can be adjusted according to the requirements or designs, and the present disclosure is not limited thereto. In the embodiment, at least one of the first output plate 42 and the second output plate 43 can be used as the power output of the reducer 1. The present disclosure is not limited thereto.

In the embodiment, the first output plate 42 and the second output plate 43 are located at two opposite sides of the inner gear wheel 2 along the axial direction C, and disposed on two outer sides of the inner gear wheel 2 along the radial direction R. In that, the outer gear plate 30 is located between the first output plate 42 and the second output plate 43. Preferably but not exclusively, both of the first output plate 42 and the second output plate 43 are served as the output ends of the reducer 1 to provide the power output. In the embodiment, there are two sets of roller bearings 44, one set is arranged between the first output plate 42 and one outer side of the inner gear wheel 2 along the radial direction R, and the other set is arranged between the second output plate 43 and another opposite outer side of the inner gear wheel 2 along the radial direction R. The plurality of rollers in two sets of bearing rollers 44 are configured to run between the front end of the inner gear wheel 2 and the first output plate 42 and between the rear end of the inner gear wheel 2 and the second output plate 43.

Figure 4:
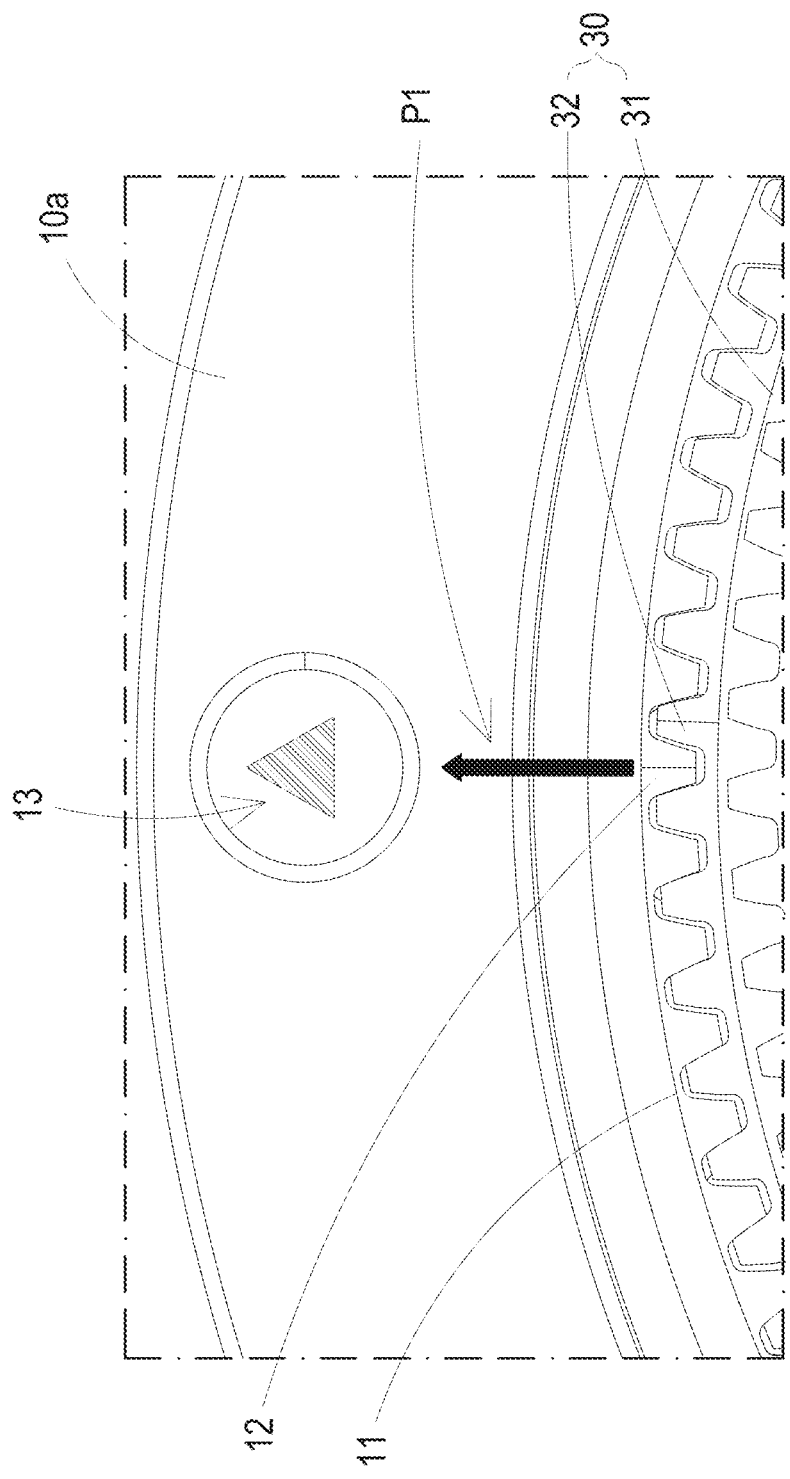
FIG. 4 is a schematic diagram showing the force transmission path of the inner ring wheel without an impact absorption structure.

Preferably but not exclusively, in the embodiment, the body wheel 10 of the inner gear wheel 2 is made of metals or non-ferrous metal materials. If there is no such impact absorption structure, the stress will be transmitted in the shortest path. It is easy to cause structural damage to the narrower body wheel. As shown in FIG. 4, when the original inner-gear body wheel 10*a* in the conventional product design is operated, the inner gears 12 on the inner circumferential side are engaged by the outer gears 32 of the outer gear plate 30 along the radial direction R. The impact force endured by the inner gears 12 is directly transmitted to the fixing hole 13 along the shortest path P1, which is indicated by the thick black arrow in the drawing. That is, the impact force is transmitted along the radial direction R vertical to the circumferential direction F of the inner gear wheel 2 toward the fixing hole 13. This force transmission method is not conducive to the long-term operation of the reducer.

Moreover, it is easy to cause the direct stress on the contact point of the inner gears 12, causing structural damage.

Figure 5:
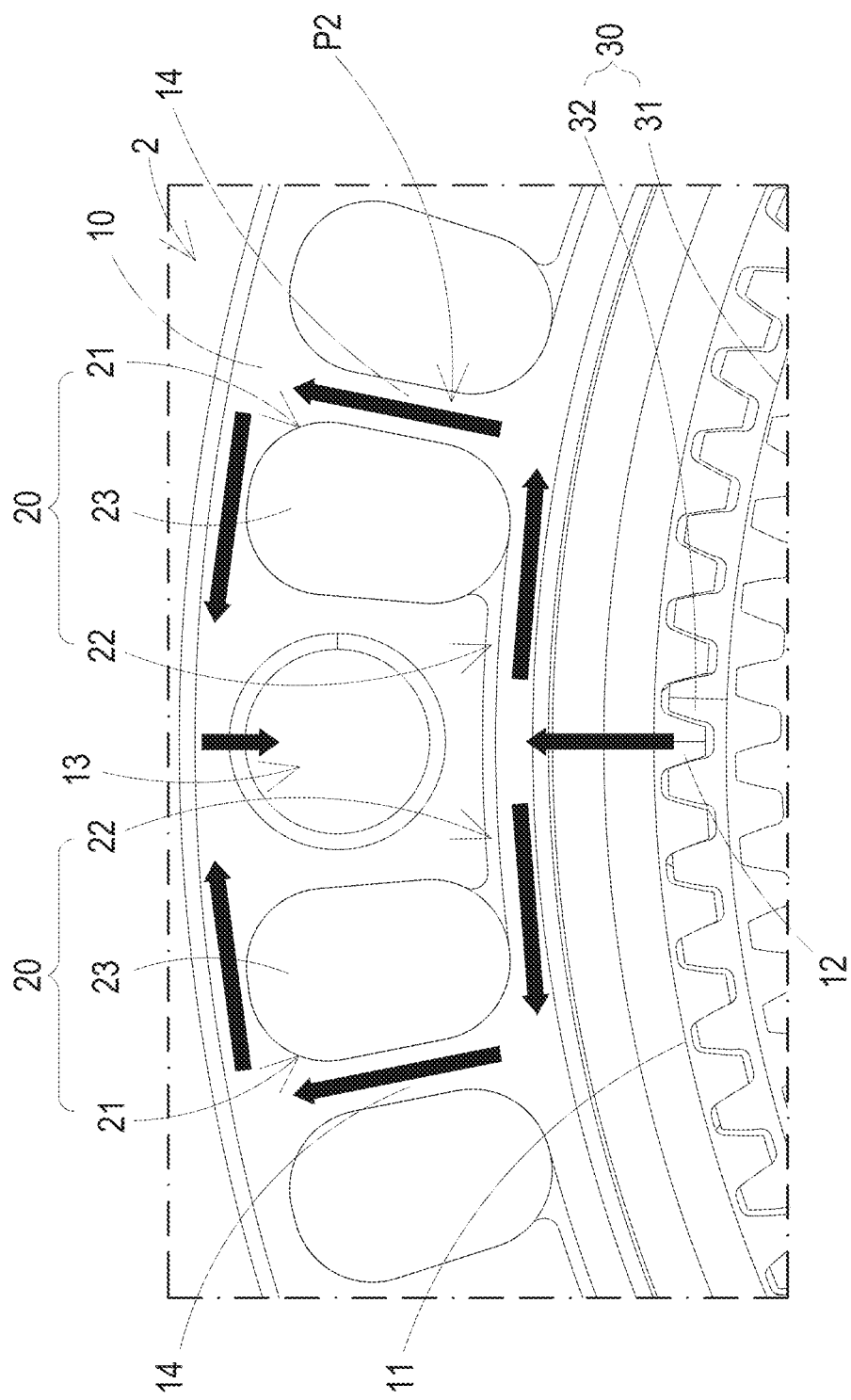
FIG. 5 is a schematic diagram showing the force transmission path of the inner gear wheel with the impact absorption structure according the embodiment of the present disclosure.
Figure 6:
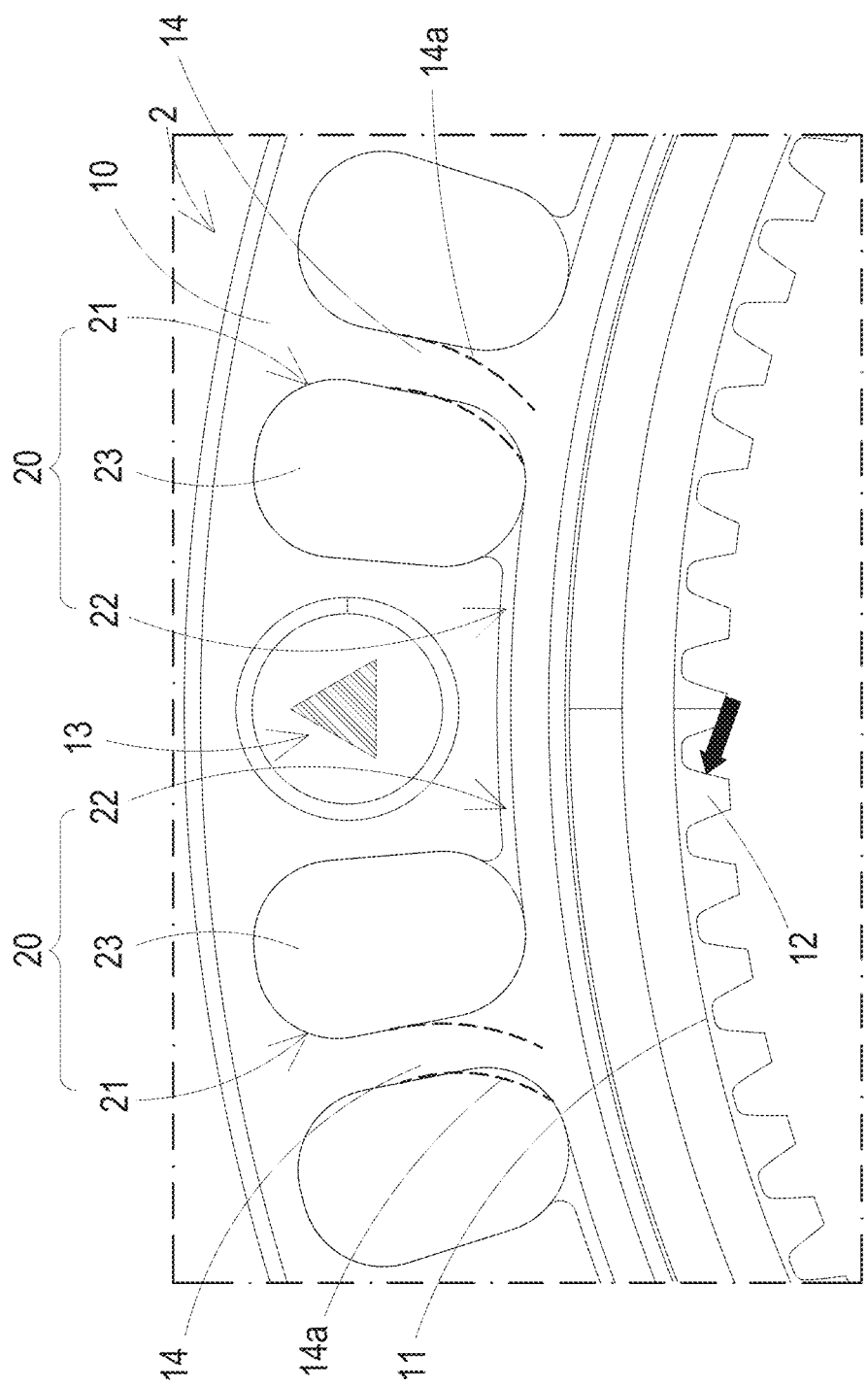
FIG. 6 is a schematic diagram showing the force deformation of the inner gear wheel with the impact absorption structure according to the embodiment of the present disclosure.

As shown in FIG. 5, in the embodiment, the inner gear wheel 2 of the present disclosure is formed based on the original inner-gear body wheel 10a in the conventional product. Specifically, the connecting slit 22 is formed at the front edge of the fixing hole 13 in the stress transmission direction of the impact force along the radial direction R, and two long hollow openings of the buffer grooves 21 are respectively opened at the left and right ends of the connecting slit 22 in the circumferential direction F. Furthermore, the buffer elements 23 are correspondingly accommodated within the buffer grooves 21. In this way, each impact absorption structure 20 is formed between the corresponding fixing hole 13 and the inner gears 12, and provides the protection functions at the front side, the left side and the right side of the fixing hole 13 that bears the impact force. As shown in FIG. 5 and FIG. 6, when the reducer 1 is operated and the torque is transmitted to the inner gear wheel 2 through the outer gears 32 of the outer gear plate 30, the force transmission is guided through the impact absorption structure 20 of the present disclosure to bypass the front edge of the fixing hole 13 and closer to the inner side of the connecting slit 22 in the radial direction R. Namely, the stress is transmitted by taking a longer path P2 than the path P1 shown in FIG. 4, and bypasses the connecting slit 22, the buffer grooves 21 before being finally transmitted to the fixing hole 13. Thus, a better impact protection effect is achieved. The longer path P2 is indicated by the thick black arrow in the drawing. Furthermore, in the embodiment, the impact absorption structure 20 further fills the long hollow opening of the buffer groove 21 with the buffer element 23 made of elastic high-damping buffer materials. When the inner gear wheel 2 is stressed, the spaced arm 14 formed between each adjacent two of the impact absorption structures 20 is extruded to generate the deformation 14a. However, with the elastic high-damping buffer materials of the buffer element 23 being extruded and deformed by stress, the impact force is further absorbed to achieve the effect of protecting the inner gear wheel 2. The structural deformation is indicated by the dotted line in the drawing. In the present disclosure, the original inner gear wheel in the conventional product shown in FIG. 4 is further designed and produced to form an easy-to-deform structure served as the impact absorption structure 20 shown in FIG. 5 and FIG. 6. The impact absorption structure 20 is further combined with the buffer element 23 made of elastic high-damping buffer materials. When the inner gears 12 of the inner gear wheel 2 is stressed, the elongated path P2 for transmitting the stress to the screw fixing hole 13 is achieved, and the impact absorption effect is effectively improved. Certainly, the present disclosure is not limited thereto.

Notably, in the embodiment, the reducer 1 suitable for the inner gear wheel 2 with the impact absorption structure 20 is not limited to the reducer structure with the tooth difference planetary reducer architecture. The inner gear wheel 2 with the impact absorption structure 20 of the present disclosure can be applied to other reducers, which inputs the torques through central shaft and outputs the torques through the outer shaft, or is called as a center input reducer structure. Certainly, the design of the impact absorption structure 20 corresponding to the fixing hole 13 provided in the present disclosure can also be applied to the other types of reducers. For example, it allows to input the torques through the outer-ring shaft of the reducer and output the torques through the central shaft, or it is called as the outer-ring input structure. This type of structure can also be processed with the connecting slits and long hollow openings corresponding to the fixing points, and filled with the buffer elements, so that the impact force transmitted from the inner gear wheel to the fixing points on the outer gear plate also can be properly absorbed, the impact on the inner gear wheel is reduced, and the life of the device is extended. Certainly, the present disclosure is not limited thereto and not redundantly described herein.

In summary, the present disclosure provides an inner gear wheel with an impact absorption structure and a reducer using the same. The impact absorption structure is constructed without increasing the volume of the device to meet the design considerations of processing convenience, cost reduction and volume reduction, and to achieve the purpose of improving the impact absorption effect. In the reducer for example a tooth difference planetary reducer architecture, the inner gear wheel made of metal or non-ferrous metal is designed to form an easy-to-deform impact absorption structure, and combined with buffer elements made of elastic high-damping materials. In that, when the inner gears of the inner gear wheel are stressed, the transmission path for transferring the stress to the screw fixing holes is elongated, and the impact absorption effect is improved. The inner gear wheel is designed as an easy-to-deform impact absorption structure combined with buffer elements without increasing the size of the entire structure. Therefore, it has great advantages in terms of convenient processing, cost reduction and volume reduction. In case of that the reducer is a planetary reducer with a tooth difference structure, the torque generated by a mechanical device such as a motor is inputted through the input shaft of the reducer connected thereto, so that the outer gear plate is rotated to perform the revolution and rotation motions. Then the output pin and the output plate are driven by the outer gear plate to rotate and output the torque. When the plurality of outer gears of the outer gear plate are engaged with the plurality of inner gears of the inner gear wheel, the impact force endured by the inner gears is further transmitted to the fixing holes of the inner gear wheel. In the present disclosure, an impact absorption structure is installed on the shortest path from the inner gears to the fixing holes, so that the impact force endured by the inner gears is transferred to the fixing holes along a longer path, and a better impact protection effect is achieved. Furthermore, the impact absorption structure in the present disclosure is further hollowed out in the original structure of the inner gear wheel in the conventional product, and then filled with elastic high-damping buffer materials. When the inner gear wheel is stressed, the elastic high-damping buffer materials are extruded and deformed by the stress, so that the impact force is further absorbed and the effect of protecting the ring gears is achieved. On the other hand, the impact absorption structure of the present disclosure is spatially corresponding to the fixing hole. The long hollow opening served as the buffer groove of the impact absorption structure and the connecting slit in communication therewith are designed according to the radius of the fixing hole to achieve a better designed impact absorption effect. It takes into account the effects of simple processing, less material use, and high strength.

While the disclosure has been described in terms of what is presently considered to be the most practical and preferred embodiments, it is intended to cover various modifications and similar arrangements included within the spirit and scope of the appended claims which are to be accorded with the broadest interpretation so as to encompass all such modifications and similar structures.

What is claimed is:

1. An inner gear wheel, comprising:
a body wheel, comprising an inner ring surface and a plurality of inner gears, wherein the inner ring surface arounds an axis, the plurality of inner gears are disposed around the inner ring surface, and each of the plurality of inner gears is partially connected to an outer gear plate and engaged with the outer gear plate in a radial direction;
a plurality of fixing holes, disposed on the body wheel and penetrating the body wheel along an axial direction; and
a plurality of impact absorption structures, spatially corresponding to the plurality of fixing holes and penetrating the body wheel along the axial direction,
wherein each of the plurality of impact absorption structures comprises a pair of buffer grooves, a connecting slit and a pair of buffer elements, the pair of buffer grooves are disposed at two sides of a corresponding one of the plurality of fixing holes along a circumferential direction, the connecting slit is arranged between the inner ring surface and the corresponding one of the plurality of fixing holes, extended along the circumferential direction and connected between the pair of buffer grooves, and wherein the pair of buffer elements are made of elastic high-damping materials and disposed in the pair of buffer grooves respectively to absorb a stress transmitted from the outer gear plate engaged with the inner gear wheel.

2. The inner gear wheel according to claim 1, wherein each of the buffer grooves includes a long hollow opening, the long hollow opening has a radial length and a circumferential width, and the radial length is greater than the circumferential width.

3. The inner gear wheel according to claim 2, wherein a spaced width is formed between each adjacent two of the impact absorption structures, and a ratio of the spaced width to the radial length is ranged from 1:3 to 1:6.

4. The inner gear wheel according to claim 2, wherein the long hollow opening comprises an arc portion located at a long end thereof and having a curvature radius, the fixing hole has an opening radius, and the curvature radius is smaller than the opening radius.

5. The inner gear wheel according to claim 4, wherein the connecting slit has a slit gap, and a ratio of the slit gap to the opening radius is ranged from 1:4 to 1:7.

6. The inner gear wheel according to claim 1, wherein each of the plurality of fixing holes is a screw hole, which is fixed by a corresponding screw to form a fixed point for fixing the inner gear wheel.

7. The inner gear wheel according to claim 1, wherein the body wheel is made of metals or non-ferrous metals.

8. The inner gear wheel according to claim 1, wherein the outer gear plate comprises an outer ring surface and a plurality of outer gears, wherein a tooth number of the plurality of outer gears and a tooth number of the plurality of inner gears of the body wheel are different.

9. A reducer, comprising:
an input shaft arranged along an axial direction and configured to receive a power input;
an outer gear plate comprising an outer ring surface, a central shaft hole and a plurality of outer gears, wherein the central shaft hole penetrates the outer gear plate along the axial direction and is passed through by the input shaft, and the plurality of outer gears are disposed on the outer ring surface along a circumferential direction;
an inner gear wheel sleeved on the outer gear plate, and comprising:
a body wheel comprising an inner ring surface and a plurality of inner gears, wherein the inner ring surface is disposed around the input shaft, the plurality of inner gears are disposed around the inner ring surface, and each of the plurality of inner gears is partially connected to and engaged with the outer gear plate in a radial direction;
a plurality of fixing holes disposed on the body wheel and penetrating the body wheel along the axial direction; and
a plurality of impact absorption structures spatially corresponding to the plurality of fixing holes and penetrating the body wheel along the axial direction, wherein each of the plurality of impact absorption structures comprises a pair of buffer grooves, a connecting slit and a pair of buffer elements, the pair of buffer grooves are disposed at two sides of a corresponding one of the plurality of fixing holes along the circumferential direction, the connecting slit is arranged between the inner ring surface and the corresponding one of the plurality of fixing holes, extended along the circumferential direction and in communication between the pair of buffer grooves, and the pair of buffer elements are made of elastic high-damping materials and disposed in the pair of buffer grooves respectively to absorb a stress transmitted from the outer gear plate engaged with the inner gear wheel; and
an output plate arranged along the axial direction, disposed on an outer side of the inner gear wheel along the radial direction, and connected to the outer gear plate through an output pin, wherein when the power input is inputted through the input shaft, the input shaft drives the plurality of outer gears of the outer gear plate to engaged with the plurality of inner gears of the inner gear wheel, and the outer gear plate is rotated with the output pin, so that the output pin drives the output plate to perform a rotational motion and output a torque.

10. The reducer according to claim 9, wherein each of the buffer grooves includes a long hollow opening, the long hollow opening has a radial length and a circumferential width, and the radial length is greater than the circumferential width.

11. The reducer according to claim 10, wherein a spaced width is formed between each adjacent two of the impact absorption structures, and a ratio of the spaced width to the radial length is ranged from 1:3 to 1:6.

12. The reducer according to claim 10, wherein the long hollow opening comprises an arc portion located at a long end thereof and having a curvature radius, the fixing hole has an opening radius, and the curvature radius is smaller than the opening radius.

13. The reducer according to claim 12, wherein the connecting slit has a slit gap, and a ratio of the slit gap to the opening radius is ranged from 1:4 to 1:7.

14. The reducer according to claim 9, wherein each of the plurality of fixing holes is a screw hole, which is fixed by a corresponding screw to form a fixed point for fixing the inner gear wheel.

15. The reducer according to claim 9, wherein the body wheel is made of metals or non-ferrous metals.

16. The reducer according to claim 9, wherein the output plate comprises a first output plate and a second output plate located at two opposite ends of the inner gear wheel, respectively.

17. The reducer according to claim 9, wherein the inner gear wheel is connected to the output plate through a roller bearing.

\* \* \* \* \*